(No Model.) 2 Sheets—Sheet 1.
G. W. JENINGS & C. W. BRADLEY.
VENTILATOR SCREEN FOR REFRIGERATOR CARS.
No. 534,832. Patented Feb. 26, 1895.
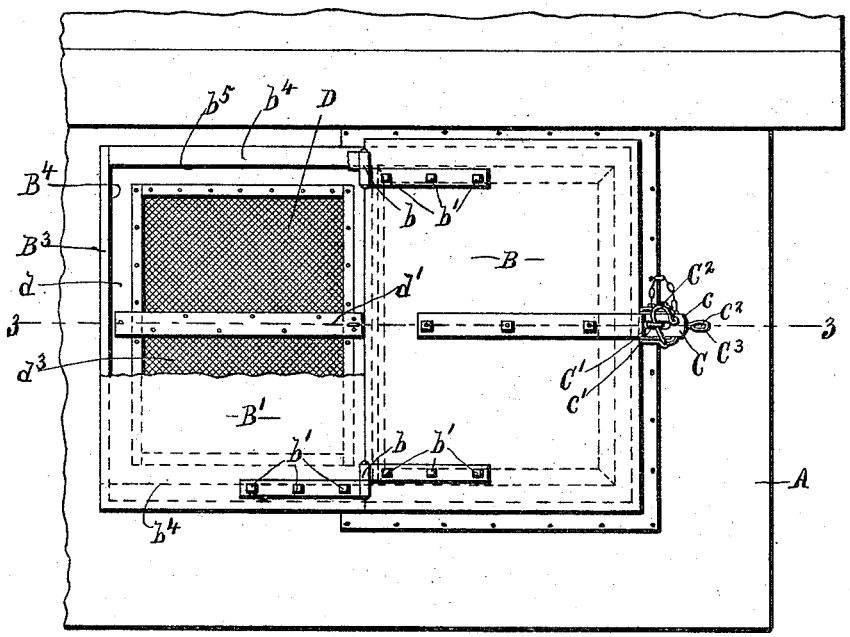
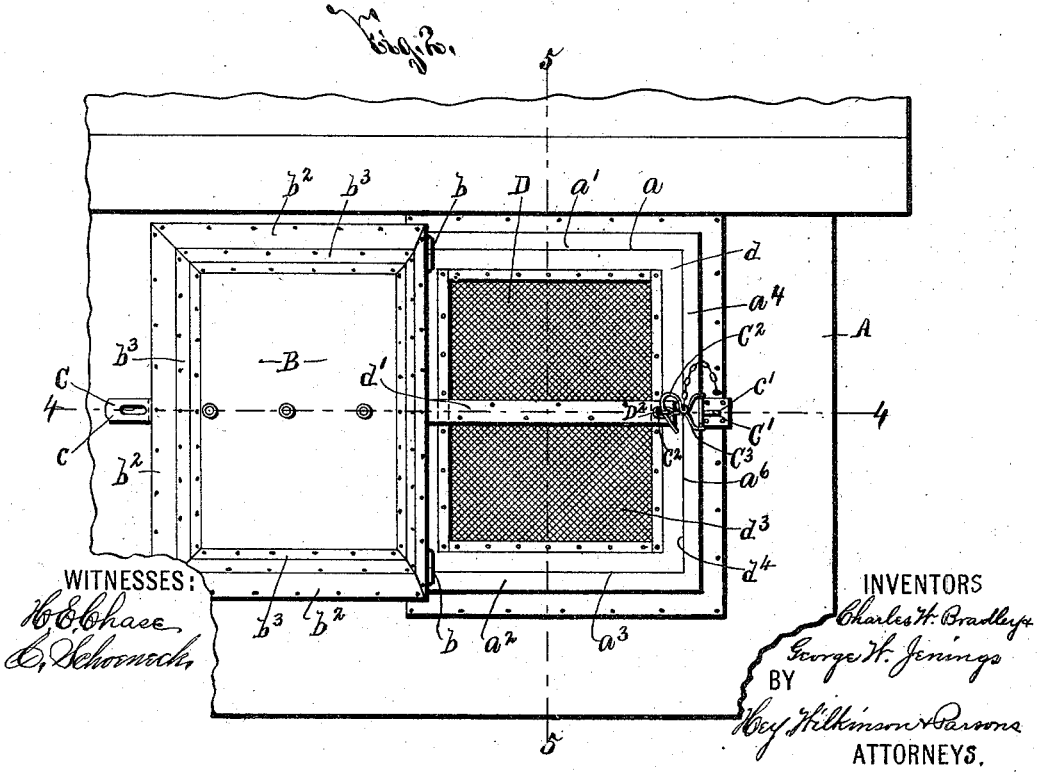
WITNESSES:
INVENTORS
Charles W. Bradley
George W. Jenings
BY
Wilkinson & Parsons
ATTORNEYS.

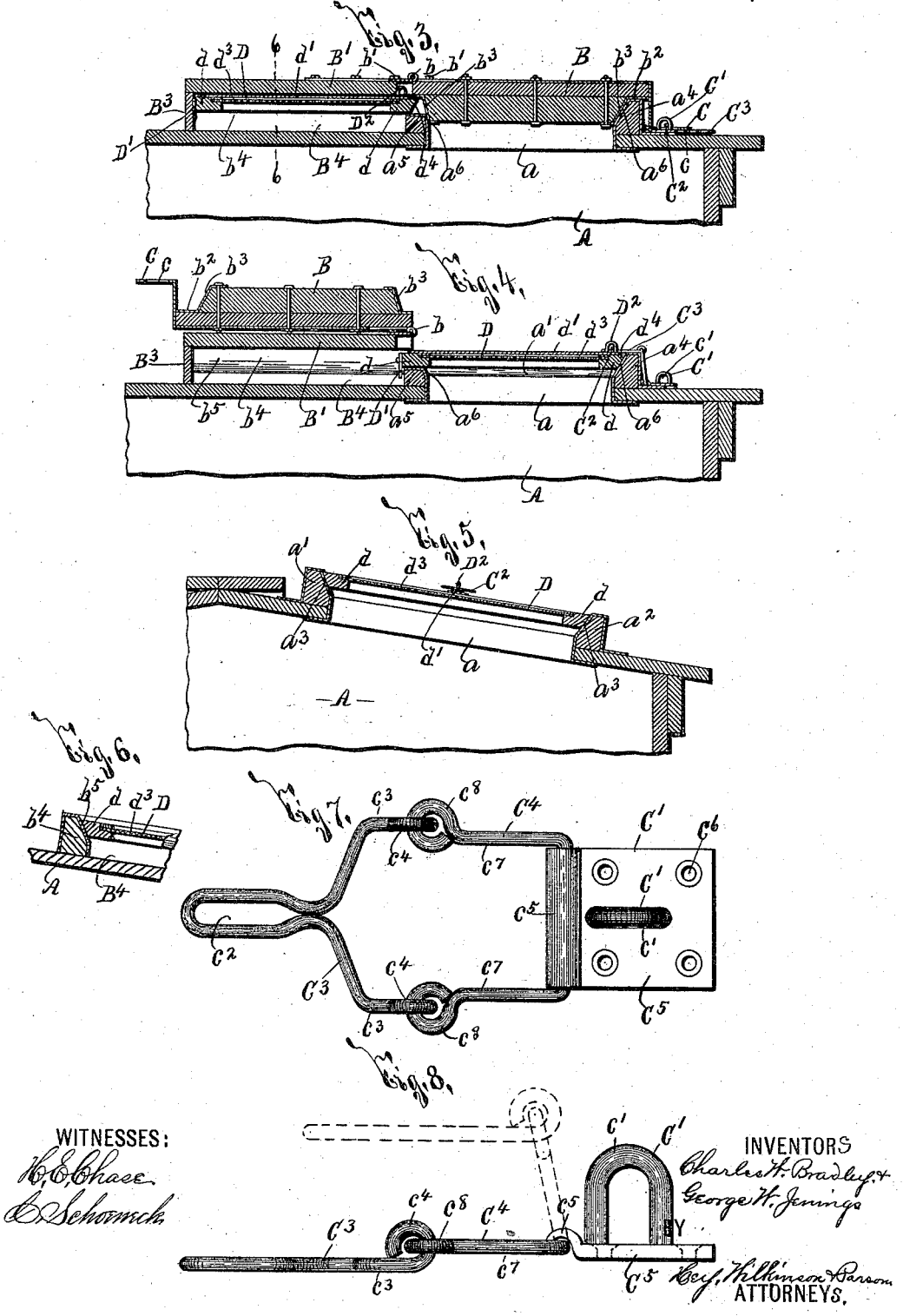

UNITED STATES PATENT OFFICE.

GEORGE W. JENINGS AND CHARLES W. BRADLEY, OF ROCHESTER, NEW YORK.

VENTILATOR-SCREEN FOR REFRIGERATOR-CARS.

SPECIFICATION forming part of Letters Patent No. 534,832, dated February 26, 1895.

Application filed July 19, 1894. Serial No. 517,981. (No model.)

*To all whom it may concern:*

Be it known that we, GEORGE W. JENINGS and CHARLES W. BRADLEY, of Rochester, in the county of Monroe, in the State of New York, have invented new and useful Improvements in Ventilator-Screens, of which the following, taken in connection with the accompanying drawings, is a full, clear, and exact description.

Our invention relates to improvements in ventilator screens, particularly applicable for use with refrigerator cars and similar vehicles, and has for its object the production of a simple and practical device, which is economically manufactured, is readily applied, is convenient and durable in use, and is easily and practically operated; and to this end it consists, essentially, in the general construction and arrangement of its component parts, all as hereinafter more particularly described and pointed out in the claims.

In describing this invention, reference is had to the accompanying drawings, forming a part of this specification, in which like letters indicate corresponding parts in all the views.

Figures 1 and 2 are top plan views of corresponding portions of a vehicle or car provided with our improved invention, a portion of the upper wall above the screen being broken away at Fig. 1, and the cover for the aperture in the vehicle or car and the screen for ventilating said aperture being shown respectively at Fig. 1 in their operative and inoperative positions, and vice versa at Fig. 2. Figs. 3 and 4 are longitudinal vertical sectional views, taken respectively on lines 3—3 and 4—4, Figs. 1 and 2. Figs. 5 and 6 are transverse vertical sectional views, taken respectively on lines 5—5 and 6—6, Figs. 2 and 3; and Figs. 7 and 8 are, respectively, top plan and side elevation of the detached fastening member secured to the vehicle or car, the intermediate and engaging sections of said member being illustrated by dotted lines at Fig. 8 as in their position assumed when engaged with the ventilator screen.

It is well known that screens are necessarily used with refrigerator cars and similar vehicles, and must be so constructed as to be removable from operative position to permit closing of the aperture across which they extend. As usually constructed these screens are extremely liable to become misplaced or lost, and, when desired for immediate use, great delay and inconvenience are often occasioned in finding or replacing the same.

Our improved screen is so constructed as to permit ready closing of the aperture across which it extends, and is not at all liable to become misplaced or lost.

A represents a vehicle or car, which is of any desirable form, size, and construction, not necessary to herein illustrate or describe, and is provided with an ordinary hatchway or opening $a$ for facilitating the entrance of ice, &c., within the vehicle or car. This opening $a$ is of the usual construction, and is formed with opposite walls $a'$ $a^2$ having transversely inclined surfaces $a^3$, and end walls $a^4$ $a^5$ arranged at an angle with the walls $a'$ $a^2$ and preferably formed with similar transversely inclined surfaces $a^6$.

As clearly seen at Figs. 3 and 4, the top face of the end wall $a^5$ is depressed considerably beneath the top faces of the walls $a'$ $a^2$ $a^4$, which are preferably disposed in substantially the same inclined plane. If desired, the top faces of the walls $a'$ $a^2$ $a^4$ may be arranged in a horizontal instead of an inclined plane.

The aperture $a$ is provided with a cover B of any desirable form, size, and construction, here illustrated as secured by hinges $b$ to the outer edge of a wall B' arranged at one side of the aperture $a$. The hinges $b$ are shown as secured by carriage bolts $b'$, but may be evidently secured by any other suitable fastening means.

The cover B is provided with a normal lower bearing face $b^2$ for engaging the top faces of the aperture walls $a'$ $a^2$ $a^4$ and with depending transversely inclined faces $b^3$ for engaging the inclined surfaces $a^3$ $a^6$ of the aperture walls $a'$ $a^2$ $a^4$ $a^5$. When the cover is in its normal position the aperture $a$ is effectually closed, and the cover is held in said position by suitable fastening means, here illustrated as fastening members C C' secured respectively to the cover B and the vehicle or car A. The fastening member C is fixed to the cover B in any desired manner, and is provided with a laterally extending slotted or perforated foot $c$ and the fastening member $C'$, which will be hereinafter described, is provided with a loop or perforated shoulder $c'$ for entering the slot of the foot $c$. A suitable hook or pin $C^2$ is passed through the loop or perforated shoulder $c'$, and prevents disengagement of the fastening members C C'.

Arranged at one side of the aperture beneath the wall $B'$, previously described, is a suitable screen guide preferably consisting of opposite rails $b^4$ $b^4$ forming continuations of the walls $a'$ $a^2$ and provided with inclined surfaces $b^5$ aligned with the surfaces $a^3$ of the walls $a'$ $a^2$. A suitable strip $B^3$ is secured at the inner ends of the rails $b^4$ $b^4$, and, as is apparent, the wall $B'$, the guide rails $b^4$ $b^4$, and the strip or end wall $B^3$ form an inclosed chamber $B^4$.

A screen D of any desirable form, size, and construction is arranged normally within the chamber $B^4$, and preferably consists of a rectangular frame $d$ provided with a longitudinal substantially central bar $d'$ and a perforated central portion $d^3$ consisting preferably of wire gauze or other similar material. Opposite sides of the screen D rest upon the surfaces $b^5$ of the guide rails $b^4$ $b^4$, and are similarly inclined transversely. The end side of the screen frame $d$ adjacent to the aperture $a$ is formed with an inclined surface $d^4$ for engaging the corresponding surface $a^6$ of the wall $a^4$ of the aperture $a$ when the screen is in its operative position, and the opposite end side of the screen frame $d$ is adapted to abut against the inner face of the strip or wall $B^3$, previously referred to.

The screen D is normally arranged directly beneath the wall $B'$, as clearly seen at Figs. 1 and 3 with its edge $d^4$ at one side of the aperture $a$, so as to permit the cover B to assume its operative position for closing the aperture $a$. As clearly seen at Fig. 3, when the cover B is in its operative position its lower portion projects within the aperture $a$ at one side of the screen guide, and one of the edges of the cover is arranged at one side of the screen, and is adjacent to an edge thereof, and acts as a stop to prevent undue movement of the screen in its guide toward said aperture. When the cover is swung backwardly to its inoperative position upon the wall $B'$, as illustrated at Fig. 4, the screen D is moved along the guide strips $b^4$ $b^4$ and across the aperture $a$, and, during this movement, is supported by said guide strips and the corresponding walls $a'$ $a^2$ of the aperture $a$ forming a continuation of said guide strips. Undue movement of the screen D is prevented by suitable shoulders $D'$ secured thereto and arranged to engage the wall $a^5$.

The screen D is held in its operative position by the same fastening member $C'$ for similarly holding the cover B, and is provided with a fastening member or perforated shoulder $D^2$ for entering a perforation or slot $c^2$ in the engaging section $C^3$ of the fastening member $C'$. The opposite end of the section $C^3$ is formed with lengthwisely extending arms $c^3$ having eyes $c^4$ at their free ends. The fastening member $C'$ is formed with an intermediate section $C^4$ having its central portion hinged in an eye $c^5$ in the remaining section $C^5$ of the fastening member. The section $C^5$ is secured in operative position by suitable fastening means $c^6$, and the section $C^4$ is formed with arms $c^7$ extending substantially parallel with the arms $c^3$ and provided at their extremities with eyes $c^8$ hinged to the eyes $c^4$ of the engaging section $C^3$. The engaging and intermediate sections of the fastening member $C'$ are thus free to swing upwardly into their position assumed at Fig. 4 for permitting the entrance of the fastening member $D^2$ upon the screen D within the aperture or slot $c^2$ of said engaging section. The hook or pin $C^2$, previously mentioned, is then passed through the perforation in the fastening member or shoulder $D^2$, and the screen D is firmly and effectually held in its operative position. When desired to again close the aperture $a$ the hook or pin $C^2$ is withdrawn from engagement with the shoulder $D^2$, the intermediate and engaging sections of the fastening member $C'$ are folded outwardly, as indicated at Figs. 1 and 3, the screen is slid back and the cover B is then swung into operative position with its fastening member C in engagement with the shoulder $c'$ of the fastening member $C'$.

In providing with our invention, a vehicle or car having the ordinary aperture in its top wall for the entrance of ice, &c., the upper portion of one of the end walls of the aperture which projects above the upper face of said top wall of the vehicle or car is cut away; the wall $B'$, the guide rails $b^4$ $b^4$, and the strip or end wall $B^3$ are secured at one side of said end wall; the door B is hinged to the wall $B'$; and the screen D and fastening members C C' $D^2$ are then arranged in position.

The operation of our invention will be readily perceived upon reference to the foregoing description and the accompanying drawings, and it will be particularly noted that the same is economically manufactured, readily applied, is convenient and durable in use, and is easily and practically operated.

The exact detail construction and arrangement of our ventilator screens may obviously be somewhat changed without departing from the spirit of our invention, and hence we do not herein specifically limit ourselves to such exact detail construction and arrangement.

Having thus fully described our invention, what we claim as new, and desire to secure by Letters Patent, is—

1. The combination with a refrigerator vehicle provided with an aperture for the entrance of ice, &c., and a guide extending from the aperture; of a cover for opening and closing the aperture, a screen movable along the guide across the aperture and provided with a fastening member, a second fastening member secured to the vehicle and formed with a hinged intermediate section, and an engaging section hinged to the intermediate section for engaging the former fastening member, substantially as and for the purpose specified.

2. The combination with a refrigerator vehicle provided with an aperture for the entrance of ice, &c., and a guide extending from the aperture; of a screen arranged normally at one side of the aperture and movable along the guide across the aperture, and a hinged cover for opening and closing the aperture having its lower portion arranged normally within the aperture at one side of the guide and having one of its edges arranged at one side and adjacent to an edge of the screen for preventing undue movement of the screen along the guide toward the aperture, substantially as described.

3. The combination with a refrigerator vehicle provided with an aperture for the entrance of ice, &c., and a guide extending from the aperture; of a cover for opening and closing the aperture hinged at one edge and provided with a fastening member, and a screen arranged normally at one side of said aperture and movable across the same when the cover is in its inoperative position, a fastening member provided upon the screen, and a second fastening member secured to the vehicle and consisting of a section former to the vehicle and provided with a shoulder for engaging the fastening member provided on the cover, an intermediate section hinged to the fixed section, and an engaging section hinged to the intermediate section for engaging the fastening member provided on the screen, substantially as and for the purpose described.

4. The combination with a refrigerator vehicle provided with an aperture for the entrance of ice, &c., a guide extending from the aperture, and a wall arranged above the guide; of a screen arranged normally beneath said wall and movable along the guide across the aperture, and a cover for opening and closing the aperture hinged to said wall, substantially as set forth.

5. The combination with a refrigerator vehicle provided with an aperture for the entrance of ice, &c., having opposite walls formed with transversely inclined surfaces, and a guide consisting of opposite rails provided with opposite transversely inclined surfaces forming continuations of the corresponding surfaces of said aperture walls; of a screen movable along the inclined surfaces of the guide rails and the opposite aperture walls across the aperture, substantially as described.

6. The combination with a refrigerator vehicle provided with an aperture for the entrance of ice, &c., having opposite walls formed with transversely inclined surfaces, and a guide consisting of opposite rails provided with opposite transversely inclined surfaces forming continuations of the corresponding surfaces of said aperture walls; of a screen movable along the inclined surfaces of the guide rails and the opposite aperture walls across the aperture, and a cover for opening and closing the aperture having a surface for engaging the top faces of said opposite walls of the aperture, and opposite depending transversely inclined surfaces for engaging the similar surfaces of the aperture walls, substantially as specified.

7. The combination with a refrigerator vehicle provided with an aperture for the entrance of ice, &c., having opposite guide walls, and an additional wall arranged at an angle with the former walls and having its top face disposed beneath the top faces of the guide walls, and a guide consisting of opposite rails forming continuations of said opposite walls; of a screen movable along the guide walls and guide rails, and over the top face of the wall arranged at an angle with the guide wall across said aperture, substantially as described.

8. The combination with a refrigerator vehicle provided with an aperture for the entrance of ice, &c., having opposite guide walls, and an additional wall arranged at an angle with the former walls and having its top face disposed beneath the top faces of the guide walls, and a guide consisting of opposite rails forming continuations of said opposite walls; of a wall supported above the guide and having its lower face arranged above the depressed face of the latter aperture wall, and a screen arranged normally beneath said wall and movable along the guide walls and guide rails over the depressed face of the latter aperture wall and across the aperture, substantially as specified.

9. The combination with a refrigerator vehicle provided with an aperture for the entrance of ice, &c., having opposite guide walls and an additional wall arranged at an angle with the former walls and having its top face disposed beneath the top faces of the guide walls, and a guide consisting of opposite rails forming continuations of said opposite walls; of a wall supported above the guide and having its lower face arranged above the depressed face of the latter aperture wall, a screen arranged normally beneath said wall and movable along the guide walls and guide rails over the depressed face of the latter aperture wall and across the aperture, and a cover for opening and closing the aperture hinged to the wall above said guide, substantially as described.

10. The combination with a refrigerator vehicle provided with an aperture for the entrance of ice, &c., and a guide extending from the aperture; of a screen movable along the guide across the aperture and provided with a fastening member, and a second fastening member consisting of a section fixed to the vehicle, an intermediate section having its central portion hinged to the fixed section and its opposite ends formed with arms extending laterally from its central portion and provided with eyes at their free ends, and an engaging section having its central portion engaged with the former fastening member and its opposite ends formed with arms extending laterally to the corresponding arms of the intermediate section and provided with eyes engaged with the corresponding eyes of the intermediate section, substantially as specified.

In testimony whereof we have hereunto signed our names, in the presence of two attesting witnesses, at Rochester, in the county of Monroe, in the State of New York, this 14th day of July, 1894.

GEORGE W. JENINGS.
CHARLES W. BRADLEY.

Witnesses:
HAMPDEN HYDE,
ERNEST R. SMITH.